(12) United States Patent
Medina

(10) Patent No.: US 11,040,802 B2
(45) Date of Patent: Jun. 22, 2021

(54) FRUIT PROCESSING, PACKAGING AND RETAIL DISPLAY SYSTEM

(71) Applicant: Jose Louis Medina, Watsonville, CA (US)

(72) Inventor: Jose Louis Medina, Watsonville, CA (US)

(*) Notice: Subject to any disclaimer, the term of this patent is extended or adjusted under 35 U.S.C. 154(b) by 0 days.

(21) Appl. No.: 16/279,531

(22) Filed: Feb. 19, 2019

(65) Prior Publication Data

US 2020/0079553 A1 Mar. 12, 2020

Related U.S. Application Data

(60) Provisional application No. 62/729,568, filed on Sep. 11, 2018.

(51) Int. Cl.
*B65D 25/08* (2006.01)
*B65D 81/32* (2006.01)
*A23N 15/02* (2006.01)

(52) U.S. Cl.
CPC ........... *B65D 25/085* (2013.01); *A23N 15/02* (2013.01); *B65D 81/3211* (2013.01)

(58) Field of Classification Search
CPC .. B65D 25/08; B65D 25/085; B65D 81/3211; B65D 25/087; A23N 15/02; A23N 7/023; A23N 4/12; A23N 4/16; A23N 4/18; A23N 4/20; A23N 4/22; A23N 4/24; A23N 4/00; B26D 3/26; B26D 3/08; B26D 2210/02; B26D 2210/04; B26D 1/00

See application file for complete search history.

(56) References Cited

U.S. PATENT DOCUMENTS

| 3,473,588 | A | * | 10/1969 | Loveland | A23N 7/08 426/482 |
| 4,363,266 | A | * | 12/1982 | Tichy | A23N 4/24 99/545 |
| 4,981,008 | A | * | 1/1991 | Ott | B65B 25/04 53/247 |
| 4,985,268 | A | * | 1/1991 | Bingham | A23N 4/20 426/482 |
| 6,148,702 | A | * | 11/2000 | Bucks | B26D 1/0006 83/110 |
| 2002/0170398 | A1 | * | 11/2002 | Verhaeghe | B26D 7/32 83/13 |
| 2003/0039732 | A1 | * | 2/2003 | Blasco Piquer | A23N 15/00 426/482 |
| 2006/0021522 | A1 | * | 2/2006 | Ascari | A23N 7/08 99/584 |
| 2008/0014303 | A1 | * | 1/2008 | Jacops | A23L 21/11 426/8 |
| 2010/0031831 | A1 | * | 2/2010 | Farid | A23N 7/00 99/541 |

(Continued)

*Primary Examiner* — Ericson M Lachica
(74) *Attorney, Agent, or Firm* — Donald R. Boys; Central Coast Patent Agency LLC

(57) ABSTRACT

A fresh fruit-stick product has a semi-rigid tube having an inside diameter, an inside length, one closed end and an open end, a cylindrical plug of fruit having an outside diameter somewhat smaller than the inside diameter of the of the semi-rigid tube, and a length somewhat less than the inside length of the semi-rigid tube, the cylindrical plug or fruit fully inserted in the semi-rigid tube, natural fruit juice in the tube with the plug of fruit, and a sealing cap over the open end.

5 Claims, 7 Drawing Sheets

(56) References Cited

U.S. PATENT DOCUMENTS

| | | | |
|---|---|---|---|
| 2014/0113046 A1* | 4/2014 | Schwartz | A47J 43/28 |
| | | | 426/479 |
| 2014/0212555 A1* | 7/2014 | Healy | A23N 4/12 |
| | | | 426/390 |
| 2014/0272017 A1* | 9/2014 | Sepehr | B65D 85/34 |
| | | | 426/115 |
| 2017/0113368 A1* | 4/2017 | Schmeiser | B26D 3/28 |
| 2017/0332681 A1* | 11/2017 | Raeder | A47J 25/00 |
| 2018/0007947 A1* | 1/2018 | Hunt | B26D 3/26 |

* cited by examiner

FRUIT PROCESSING, PACKAGING AND RETAIL DISPLAY SYSTEM

CROSS-REFERENCE TO RELATED DOCUMENTS

The present invention claims priority to Provisional Patent Application 62/729,568, filed Sep. 11, 2018. All disclosure of the parent application is incorporated herein at least by reference.

BACKGROUND OF THE INVENTION

1. Field of the Invention

The present invention is in the field of fresh food products and pertains particularly to methods and apparatus for processing and packaging fruit for retail distribution.

2. Discussion of the State of the Art

In the art of commercial food processing, fruits of all kinds are harvested and processed for distribution to consumer outlets. Fruits are typically available in raw unprocessed form from fruit stands, markets, etc. Fruits sold in raw form are sometimes treated with chemicals to lengthen the time of freshness or to otherwise inhibit deterioration so that the fruit has a better chance of being sold. Food processors that engage in some type of processing such as cutting, slicing, clunking, and juicing or pureeing fruits often package the processed product in vacuum packed cans, plastic containers, plastic bags, and so on. Often syrups, preservatives, and other non-native substances are added to the packaged fruit, diluting the natural quality of the product.

It has occurred to the inventor as well that packaging containing processed fruits may not be suitable for storing uneaten portions of the fruit. For example, cans and some plastic containers. One problem is that containers such as cans and plastic vessels are designed in a manner that they sit upright and allow the fruit juices to settle to the bottom, allowing some of the fruit to be exposed to air and perhaps to dry to a point that the fruit is unpalatable. Other problems with fruit packaging include portability relative to use. For example, many containers require both hands and full focus relative to opening the package to access the fruit and resealing the package to preserve any fruit left for later access.

Therefore, what is clearly needed is a fruit processing system, packaging process, and display mechanism that focuses on the core healthy part of the fruit, preserves the freshness of the packaged fruit during retail shelf life, and enables access to the packaged fruit in a way that is simple and resealable.

BRIEF SUMMARY OF THE INVENTION

In an embodiment of the invention fresh fruit-stick product is provided, comprising a semi-rigid tube having an inside diameter, an inside length, one closed end and an open end, a cylindrical plug of fruit having an outside diameter somewhat smaller than the inside diameter of the of the semi-rigid tube, and a length somewhat less than the inside length of the semi-rigid tube, the cylindrical plug or fruit fully inserted in the semi-rigid tube, natural fruit juice in the tube with the plug of fruit, and a sealing cap over the open end.

In one embodiment the cylindrical plug of fruit comprises a first plug of a first fruit, having a first length, and a second plug of a second fruit, having a second length, the first and second length together being somewhat less than the inside length of the semi-rigid tube, and wherein the natural fruit juice comprises juice of each of the first and the second fruit. In one embodiment the cylindrical plug of fruit comprises a plurality of more than two plugs of common length, the total length of the plurality of plugs being somewhat less than the inside length of the semi-rigid tube. In one embodiment the open end of the semi-rigid tube has a female thread, and the sealing cap has a compatible male thread, the tube being closed by the cap by engaging the threads of the tube and the cap. And in one embodiment the product further comprises a label mounted to the outside of the semi-rigid tube.

In another aspect of the invention a point-of-sale dispenser is provided, comprising an upper volume having parallel sidewalls spaced apart by a first dimension and a partial floor inclined at a shallow angle from a front wall to a back wall, an opening between a back edge of the partial floor and the back wall of a specific width, a planar ramp below the partial floor, inclined at a downward angle from the back wall to a stop near and below the front wall of the dispenser, a quantity of fresh fruit products in semi-rigid tubes, the tubes having an outside diameter smaller than the specific width of the opening, and a length less than the width of the upper volume from sidewall to sidewall, loaded into the upper volume with the length of the tubes across the volume from sidewall to sidewall, wherein individual tubes from the quantity in the upper volume pass through the opening onto the planar ramp, forming a column of tubes down the ramp to the stop, and as one tube is removed at the front of the column, the column of tubes rolls forward, presenting a new tube at the stop, and an additional tube passes through the opening onto the planar ramp.

In one embodiment of the dispenser the fresh fruit products in semi-rigid tubes comprises fruit juice in the tube along with fruit, and, as the tubes roll in the dispenser, the fruit is immersed in the juice. In one embodiment the fruit product comprises a cylindrical plug of fruit of a length less than the length of the semi-rigid tube, and of a diameter less than an inside diameter of the semi-rigid tube. In one embodiment the fruit product comprises a first plug of a first fruit, having a first length, and a second plug of a second fruit, having a second length, both the first and the second plug having a diameter less than the inside diameter of the semi-rigid tube, with the first and second length together being somewhat less than the inside length of the semi-rigid tube, and wherein the fruit juice comprises juice of each of the first and the second fruit. And in one embodiment the fresh fruit product comprises a plurality of more than two plugs of common length, the total length of the plurality of plugs being somewhat less than the inside length of the semi-rigid tube.

In one embodiment of the dispenser an open end of the semi-rigid tube has a female thread, and a sealing cap has a compatible male thread, the tube being closed by the cap by engaging the threads of the tube and the cap. And in one embodiment the dispenser further comprises a label mounted to the outside of the semi-rigid tubes of individual ones of the fresh fruit products.

In another aspect of the invention a method for producing fresh fruit products is provided, comprising cutting a fresh fruit, producing a slab having an upper and a lower parallel surface of fruit with rind only at an outer periphery, the slab having a height of a first dimension, coring the fresh fruit vertically into a plurality of round plugs having a length equal to or greater than the first dimension, by a downward stoke of a plunger, the plunger having coring tools in a first pattern, inserting the round plugs simultaneously, in the downward stroke of the plunger, into a plurality of semi-rigid tubes held vertically in a second pattern the same as the first pattern, capping the semi-rigid tubes, sealing the fruit within, and washing and drying the semi-rigid tubes.

In one embodiment the method further comprises packing the semi-rigid tubes containing fruit for shipment to a point-of-sale. In one embodiment the method further comprises stacking a first slab of a first fruit and a second slab of a second fruit prior to the step for coring, producing plugs into the semi-rigid tubes that comprise a length of the first fruit and a length of the second fruit. In one embodiment the first fruit is pineapple and the second fruit is watermelon. And in one embodiment the method further comprises stacking more than two slabs of fruit of the same or different fruit such that overall height of the stack is just less than the length of the semi-rigid tubes, resulting in tubes comprising fruit plugs in bite-size pieces.

In another aspect of the invention a method for dispensing fruit sticks in semi-rigid tubes at a point-of-sale is provided, comprising loading a plurality of fruit sticks having fruit plugs and fruit juice in capped, semi-rigid tubes, the tubes each having a common length and a common outer diameter, into an upper volume of a dispenser apparatus, with the fruit sticks arranged length wise between parallel sidewalls spaced apart by a first dimension and supported by a partial floor inclined at a shallow angle from a front wall to a back wall, and enabling individual ones of the fruit sticks to pass through an opening of a width just greater than the outer diameter of the semi-rigid tubes, the opening at the back wall of the upper volume, onto a planar ramp inclined at a downward angle from the back wall to a stop near and below the front wall of the dispenser, the fruit sticks on the planar ramp forming a column of fruit sticks from the back wall to the stop at the front wall, wherein taking one fruit stick from the front of the dispenser at the stop, causes each of the fruit sticks in the column to roll forward to fill empty spaces, and one more fruit stick to pass through the opening to the back of the column on the planar ramp, the rolling action serving to mix fruit juice in the semi-rigid tubes with the fruit in the semi-rigid tubes.

DETAILED DESCRIPTION OF THE INVENTION

In various embodiments described in enabling detail herein, the inventor provides a unique fruit processing, packaging and retail display system that efficiently packs the best parts of fruit into a reusable package that helps preserve freshness. The present invention is described in enabling detail using the following examples, which may describe more than one relevant embodiment falling within the scope of the present invention.

Figure 1:
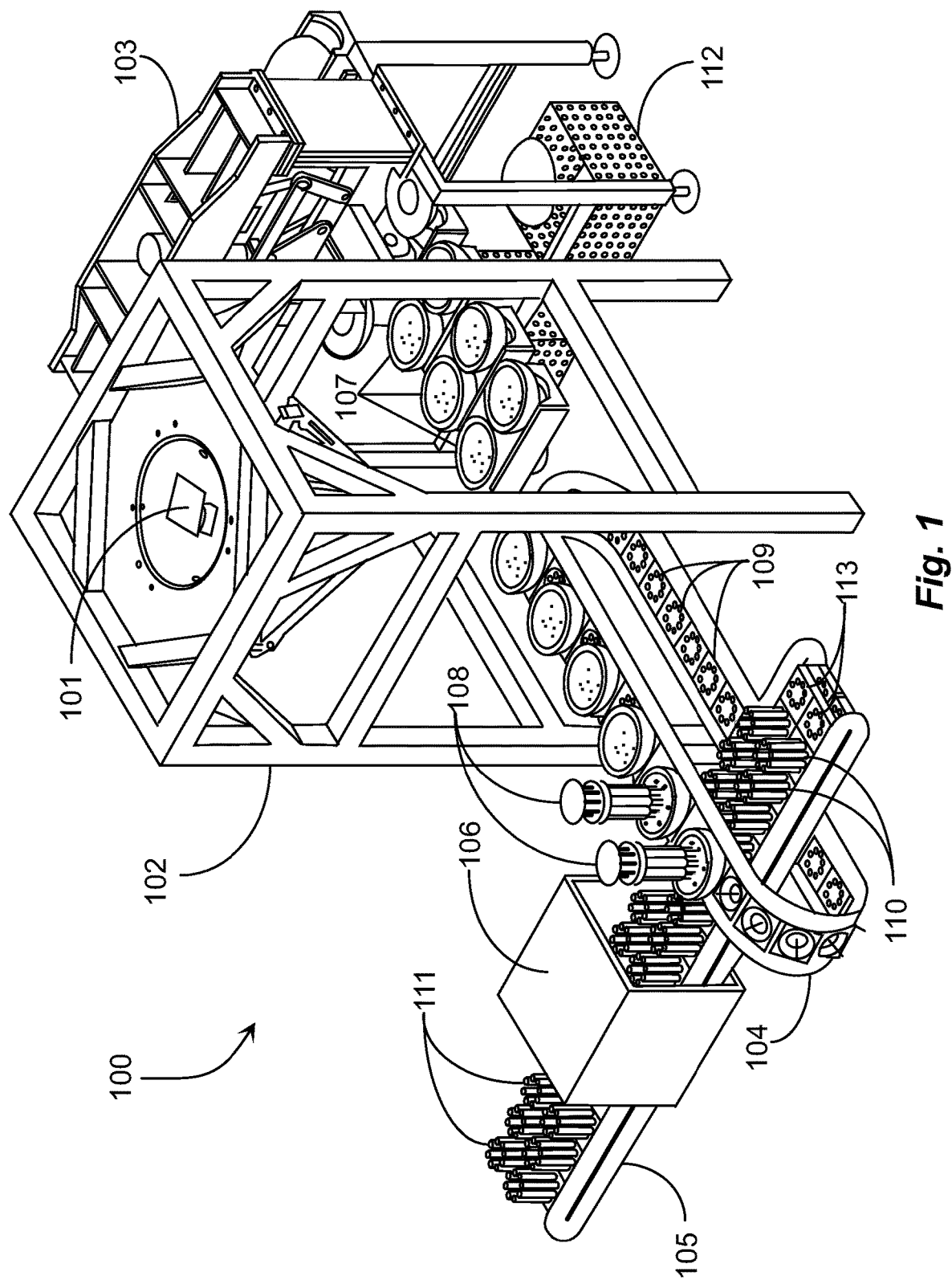
FIG. 1 is a perspective view of a fruit processing system according to an embodiment of the present invention.

FIG. 1 is a perspective view of a fruit processing system 100 according to an embodiment of the present invention. Fruit processing system 100 in this example includes a Delta robot 101 supported at an elevation by a steel frame 102. Delta robot 101 has three parallel robotic arms and multiple actuators that may enable up to 6 degrees of freedom of motion. In this embodiment, Delta robot 101 is adapted with innovative fixturing to extrude fruit linearly from a core of fruit directly into a package in batch mode. Delta robot 101 may be adapted to core and extrude into package any raw fruits that can be prepared and presented to the delta robot with a horizontal foot print (typically annular) larger than that of an extrusion fixture provided and adapted to core and extrude in batch mode (multiple fruit sticks packed in one Delta operation).

A fruit topping and tailing station 103 is provided adjacent to delta robot 101 and is adapted as a fruit preparation station capable of taking raw fruit forms and cutting them to produce uniformly thick fruit slabs for coring and extrusion of those cored plugs into staged packaging containers. In one embodiment, the fruit topping and tailing station includes a rind removal tool, a fruit top and tail cutter, and a core thickness slabbing tool that may be adjusted to slab different thicknesses of fruit for presentation to delta robot 101. In this example, watermelons 107 are slabbed for presentation to delta robot 101. Pineapple may also be processed by system 100. Other types of melons and larger fruits like grape fruits may also be processed in this manner.

In this example, watermelon slabs 107 are prepared as thick slabs and stationed for loading on a mechanical tracked-conveyor 104. Tracked conveyor 104 comprises a plurality of individual extrusion plates 109 linked together and equally spaced apart. Extrusion plates 109 may be manufactured of stainless steel or any contamination resistant composite material approved for use. Extrusion plates 109 each include a through hole pattern in the form of multiple tube relief openings (eight in this example). The pattern is arranged as an annular hole pattern in this example. Other patterns may be observed without departing from the spirit and scope of the present invention. For example, a diamond pattern, an oval pattern, or rectangular pattern might be observed. Extrusion plates 109 are linked linearly in the track conveyor and the center points of each hole pattern marks the center point of a row where the patterns lie adjacently. Track conveyor 104 may be elevated off ground level by framing and or suspension apparatus such as beam/cable apparatus without departing from the spirit and scope of the invention.

Track conveyor 104 is depicted logically in this embodiment, and may include links, rollers, cross members, and other hardware not depicted here but known in the art and available to the inventor. A second track conveyor 105 is provided and stationed orthogonally to the direction of track conveyor 104 wherein the second track conveyor 105 extends through the space between the top shelf and bottom shelf of the track conveyor 104. Track conveyor 105 comprises a plurality of individual tube station plates 113. Tube station plates 113 may be stainless steel plates or plates of a durable composite material. Tube station plates 113 are adapted to carry a batch of fruit packages in the form of upright tubes. Tube batches 110 are carried on track conveyor 105 and may align with extrusion plates 109 carrying a fruit slab for extrusion.

The pattern of openings through each plate 109 must be aligned to a like array of tubes presented on a coring/extrusion fixture 108. Coring extrusion fixture 108 may be a stainless-steel fixture having multiple coring/extrusion tubes and a plunger. Fixture 108 may be manipulated by delta robot 101 to core a fruit slab and then dispel or extrude the fruit cored into a package in a same operation. In this embodiment both extrusion plates 109 and tube station plates 113 are aligned vertically at some point so that extrusion fixture 108 having the same geometric tube configuration as the extrusion plate 109 and tube staging plate 113 may be manipulated to core the fruit slab and then lower fixture 108 through extrusion plate 109 to the top openings of the carried tubes 110. Track conveyor 104, as well as track conveyor 105, top and tail machine 103 and delta robot 101 may be powered by electric motors and may be connected through an intelligent network to move in coordination using a combination of sensors and scaled dimensional programming.

Fruit processing system 100 includes a processing machine station 106 situated over track conveyor 105 and substantially in front of stationed tube batches 111 that are filled with fruit. Machine station 106 may be adapted to cap tubes in batches using a screw/cap machine configured to cap 8 tubes full of fruit simultaneously. There may be two or more capping machines in station 106 to handle two or more rows of tube batches 111 passing under. In one embodiment, processing station 106 may also be adapted to wash and dry (rinse and air) capped tube batches resulting in capped, washed, and dried tube batches 111 ready for shipping. In one embodiment there are two separate machine stations, station 106 dedicated to capping and a next station dedicated to washing and drying. Conveyor tracks 104 and 105 may contain more than two rows and may be constructed of any length to accommodate processing stations such as station 106 without departing from the spirit and scope of the present invention.

Figure 2:
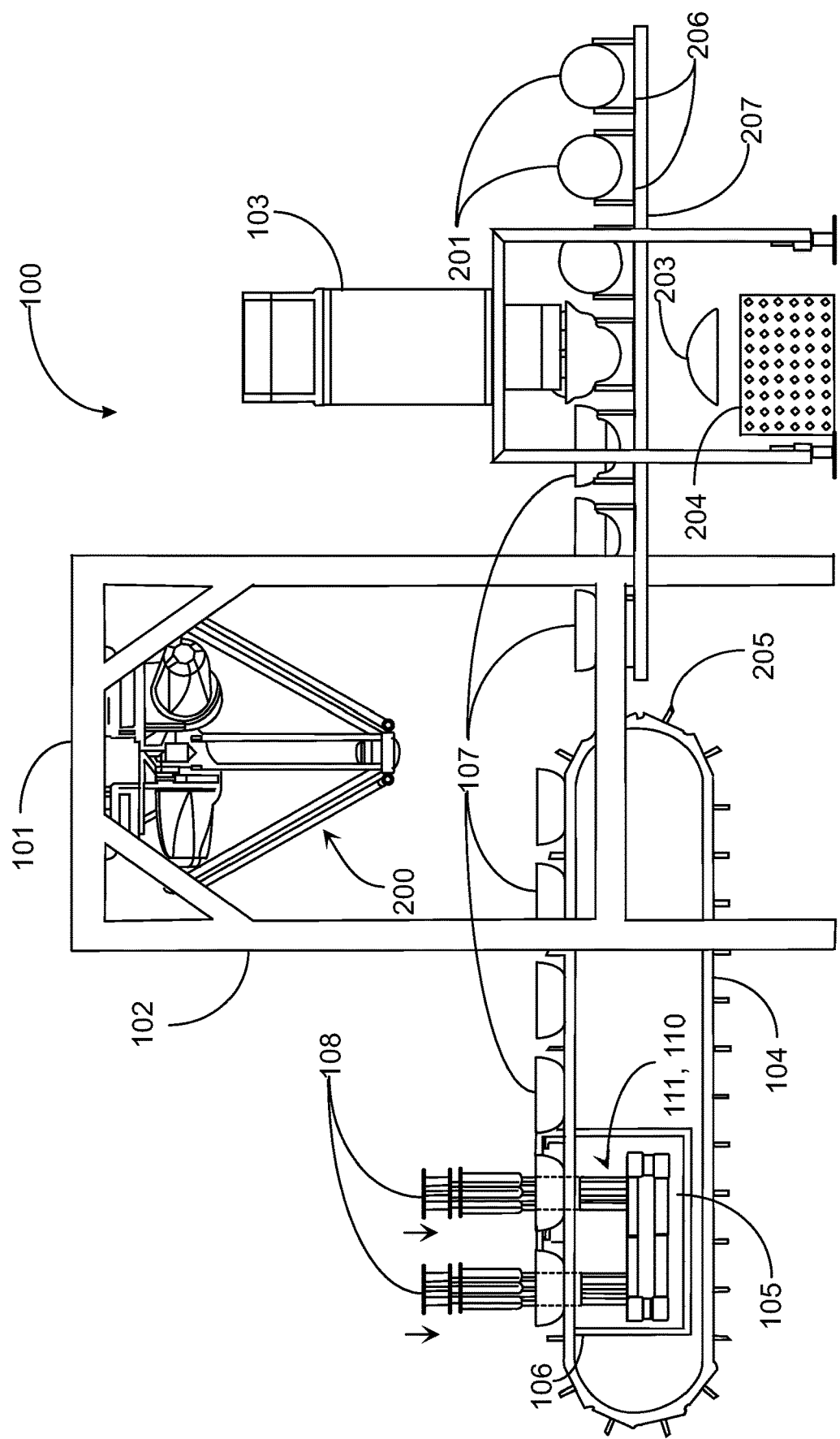
FIG. 2 is a right elevation view of the fruit processing system of FIG. 1.

FIG. 2 is a right elevation view of fruit processing system 100 of FIG. 1. In this view, arms 200 comprising the three robotic arms of delta robot 101 are visible. Arms 200 may have fixture adaptation for picking up and holding fixture 108 and positioning fixture 108 correctly over a slab of fruit waiting for coring. In one embodiment there may be many core/extrusion fixtures provided wherein delta robot 101 using robotic arms 200 places a fixture over a slab and cores the slab down to a prescribed depth for the delta operation and releases the fixture to pick up another and repeat. Fruit isolated in fixture 108 may be extruded into tubes 110 when tube batches 110 on conveyor track 105 advance to a point under the top shelf of conveyor track 105.

In one embodiment a human operator may manipulate fixture 108 to extrude fruit into stationed tubes by depressing a plunger handle on fixture 108 while the tubes of the fixture containing the fruit are aligned with the openings of the fruit packages (tubes). In another embodiment, a separate delta robot (not illustrated) may be provided to manipulate fixture 108 by first coupling with the fixture plunger handle while the fixture is in extrude position and then urging the plunger down to forcibly expel the fruit from the fixture into the packaging. In one embodiment, fixture 108 remains under control of a delta robot at all times and coring fruit and extruding the cored fruit into a fruit tube is a single repetitive operation that relies on alignment between the openings on batch tube 110 and the extrusion plate 109 of track 105 and fixture 108.

In one embodiment a human operator may load or stage whole watermelons 201 for top and tail at station 103. In this case, a whole watermelon may be halved and have the small end of each half cut off to create a watermelon slab for coring of a predetermined thickness. If the staged fruit tube is eight inches in length, then the thickness of the prepared watermelon slab should be no more than eight inches. In one embodiment station 103 may be adjustable to produce slabs having a uniform thickness dimension across the lateral footprint of the slab. A pineapple may be treated in much the same fashion, topped and tailed and slabbed to specific slab thicknesses that may be derived through machine adjustment.

In one embodiment, a human operator may place whole selected watermelons on concave crates 206 spaced apart and fixed on a conveyor (moving table) 209. In this embodiment, machine 103 may include one or more mounted cutting sheets that may be thrust into the fruit to top and tail the fruit, in this case halving a whole melon and removing the small ends from each half. A human operator may then take the watermelon slabs 107 from conveyor 207 and place them on track 104 for coring. Melon spikes 205 may be provided and fixed orthogonally and at substantial center of each rectangular extrusion plate (109, FIG. 1). In one embodiment a human operator functioning as a fruit inspector may observe slabbing at station 103 and may remove slabs the inspector deems to be of sub-quality. Discarded slabs may be disposed of in crate 204 depicted receiving a watermelon half 203.

Figure 3:
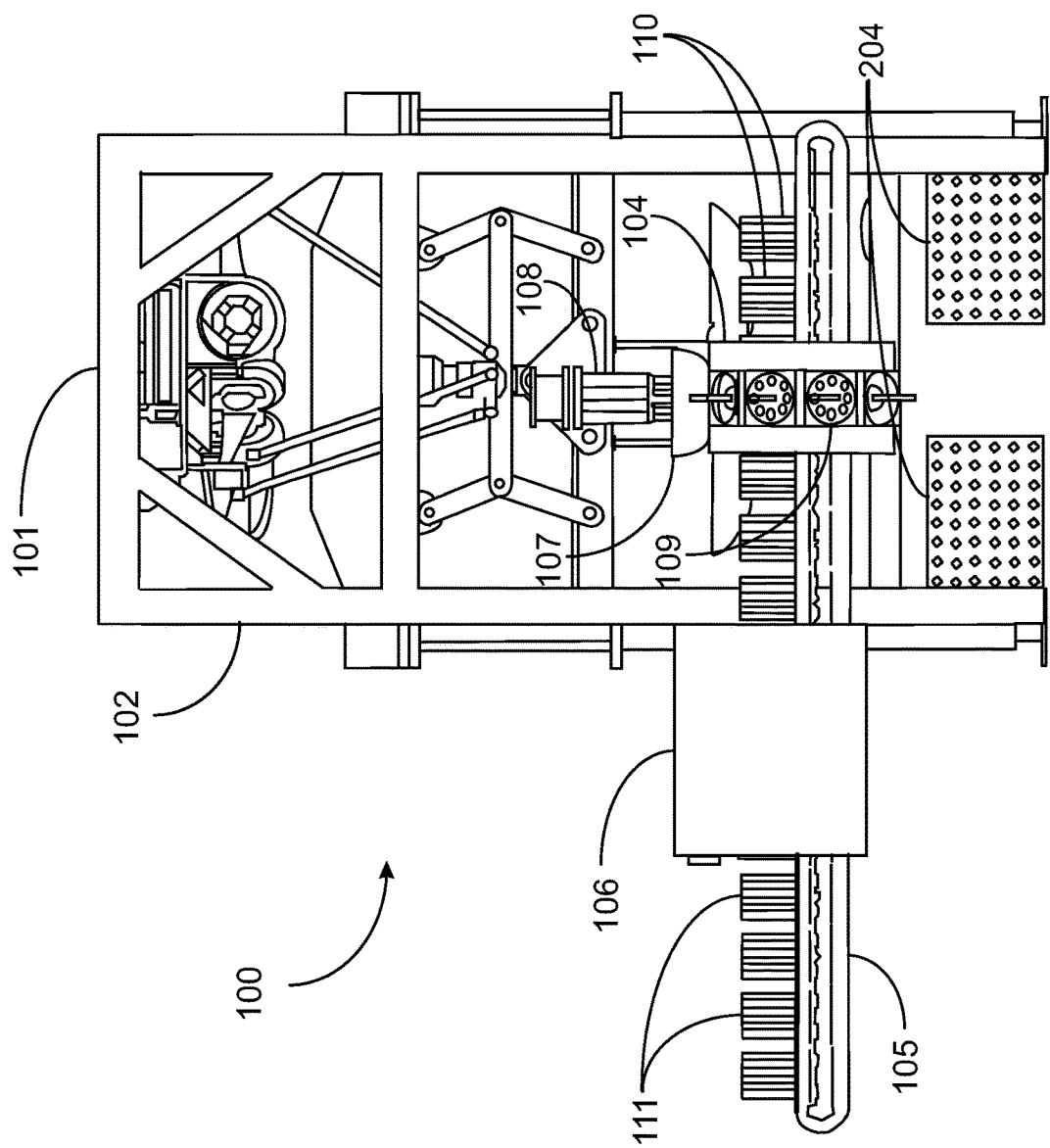
FIG. 3 is a front elevation view of the fruit processing system of FIG. 1.

FIG. 3 is a front elevation view of fruit processing system 100 of FIG. 1. In this view of fruit processing system 100, conveyor track 105 is depicted from the side at elevation. There may be two core extrusion fixtures 108, one per row of two rows. Empty tube batches arranged on conveyor track 105 may pass from right to left in this view. At a point of alignment between extrusion plates 109 and tube station plates 113, fixtures 108 are brought down through the extrusion plate relief openings and into interface with the tube openings in each tube batch 110. Delta robot 101 may extrude or otherwise expel the fruit content or cored plugs into each of the tubes.

A physical lip on the bottom ends of the tubes may provide a mounting location for staging the tubes onto tube station plates 113. In one embodiment, a human operator may place fruit package tubes onto tube station plates 113 according to the batch pattern. Fruit-filled tube batches continue on conveyor track 105 through one or more than one machine station 106 for capping the tubes, rinsing the tubes, and drying the tubes for inspection and shipment.

Top and Tail machine 103 (seen in FIG. 1 and FIG. 2) may be used to slab more than one type of fruit for packing into one fruit tube to produce fruit sticks with more than one type of fruit without departing from the spirit and scope of the present invention. For example, a pineapple slab of four-inch thickness and a watermelon slab of four-inch thickness may be stacked and cored and extruded into a same tube batch of tubes eight inches long producing, multiple (in this case eight) half-and-half fruit sticks per batch. It is noted herein that other divisions may be observed such as thirds, wherein each third of a fruit tube contains a different type of fruit. In this case heavier fruit is preferably extruded into the tube first followed by the lighter fruit because the tubes are shipped upright, and heavier fruit above would tend to deform lighter fruit below.

In one embodiment, the top and tail machine 103 may be adjusted to produce comparatively thin slabs which are smaller than but are in equal portions of the length of a tube. For example, six one-inch slabs, three pineapple and three watermelon that may then be stacked in any desired order to provide bite sized plugs stacked in a fruit tube of six inches. It is important to note that juices in the fruits are also present in the packaged and capped tubes, and the inventor provides a display container or fruit stick bin that enables the sticks to roll so the juice and fruit do not become separated in the tube for long periods. This point-of-sale apparatus and operation is described in enabling detail below.

A goal of the processing system 100 is to only core and extrude the best part of the fruit into a tube batch and there may be good fruit that is not cored because the slab was wider in diameter than the core extrusion fixture. Unused fruit may be saved and used in another process to produce juice or other fruit products without departing from the spirit and scope of the invention. Human inspectors may inspect the fruit slabs after slabbing and separate out any undesired slabs from the processing.

Figure 4:
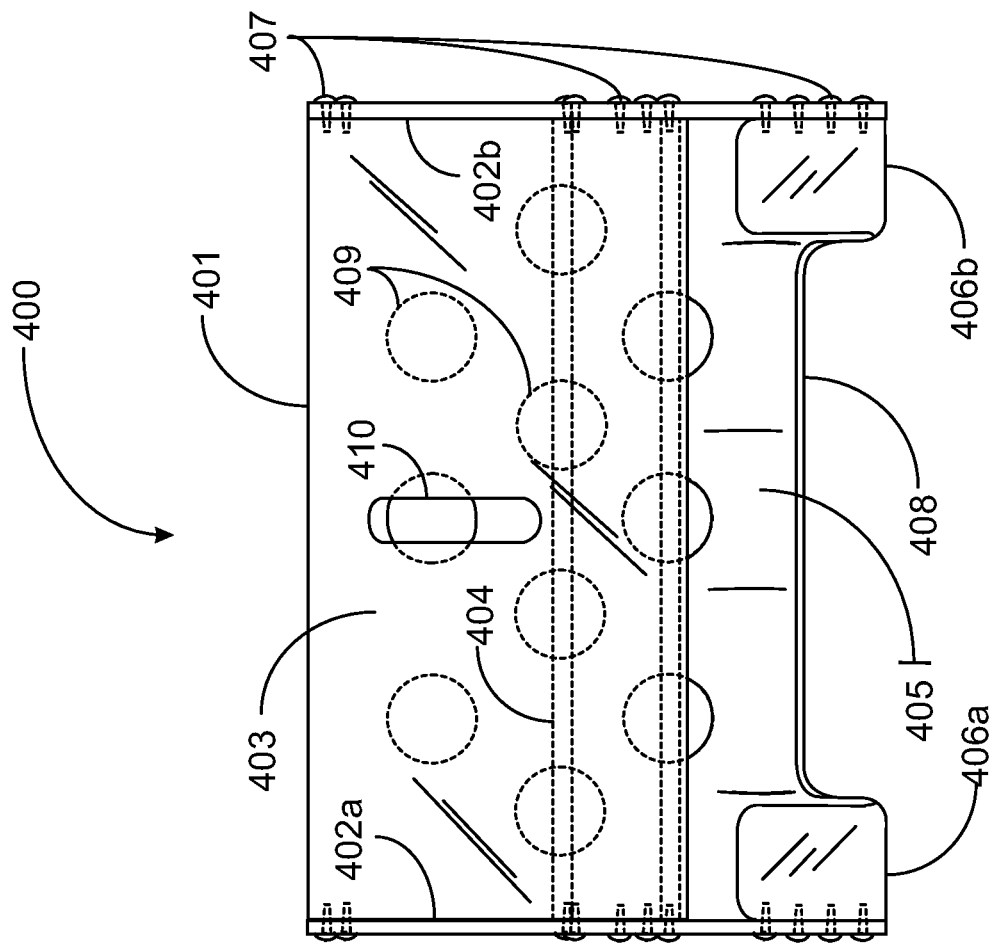
FIG. 4 is a front elevation view of a retail display bin for presenting processed fruit sticks according to an embodiment of the present invention.
Figure 5:
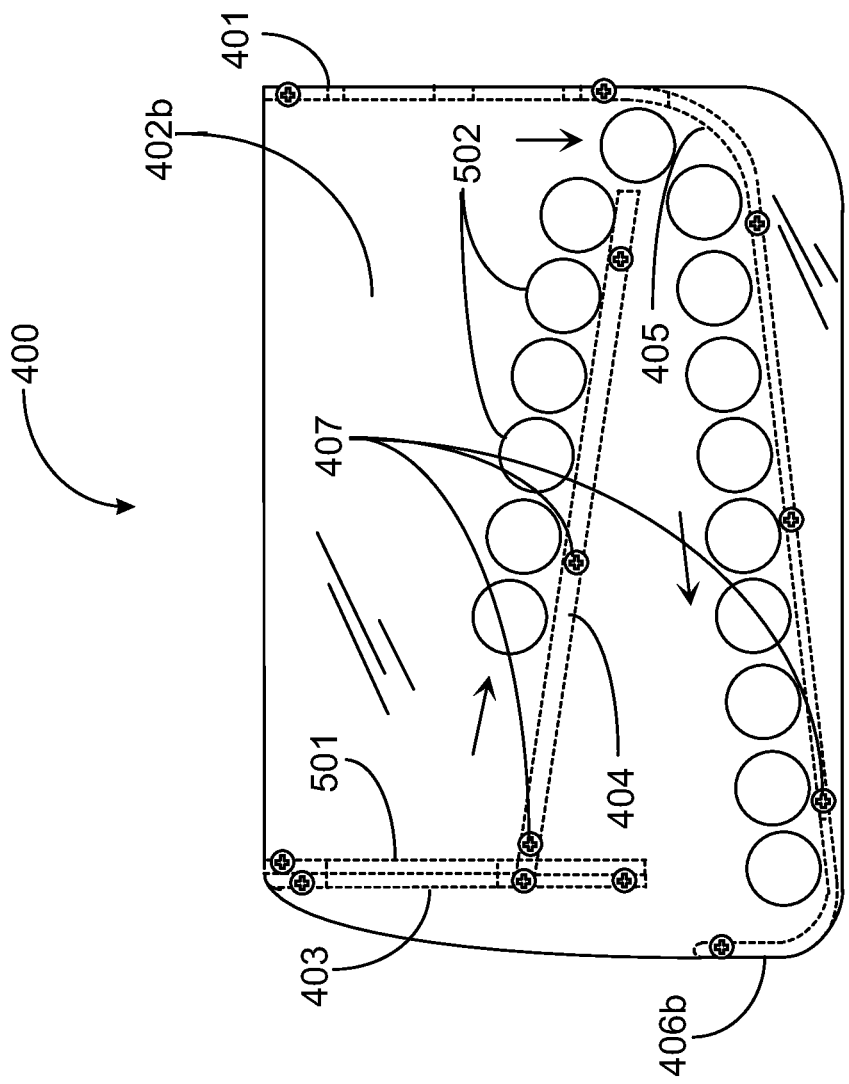
FIG. 5 is a right-side elevation view of the retail display bin of FIG. 4.

FIGS. 4 and 5 illustrate a retail display bin 400 for presenting processed fruit sticks according to an embodiment of the present invention. Display bin 400 is a rectangular translucent bin fabricated from a polymer-based sheet material like plexiglass or similar formable materials. Bin 400 is adapted to present packaged fruit sticks (tubes packed with fruit) to the public in a retail setting like in a minimarket, Starbucks™, or other any other store front or market location in a manner that aids in preservation of the saturation of cellular fruit with the fruit's juice.

Bin 400 in one embodiment comprises a formed center piece 401 that includes a floor section, substantially flat side panels 402a and 402b, and a front panel 403 that extends approximately two thirds down from an open bin top. In other embodiments there may be a top or lid that may be closed after fruit sticks are loaded. Center piece 401 may be formed by heat and jig plate press into an angle-shaped piece having a substantial bend radius wherein the bottom front edge is formed upward and has a portion (408) removed to form a left hook-well 406b and a right hook-well 406b. Hook-wells 406a and 406b define the presentation location of the fruit stick furthest to the front of the container. It is noted herein that hook-wells 406a and 406b are extended out dimensionally in front of front panel 403 for some distance enabling a user to pick up a fruit stick that has last rolled into that horizontal position.

Bin 400 includes an internal roll plate 404, best seen in FIG. 5, set horizontally across the center space of bin 400 and extended at a descending slope from front panel 403 toward the back wall of formed centerpiece 401. Left side panel 406a, right side panel 406b, front panel 403, and roll plate 404 may be secured together with screws 407, or in some embodiments by adhesive, or by engagement in slots. Front panel 403 includes a vertical slot extending through the panel that may be a mounting slot for mounting a display faceplate containing such as a logo and product advertisement and nutritional data.

The approximate bend angle for center piece 401 may be approximately 120 degrees. Center piece 401 is positioned with the back wall vertical leaving the floor to present at a 30-degree slope descending from the rear of the bin down to the portion removed leaving edge 408. The bend radius is referenced herein by element 405 and may be about 1 inch or larger to enable product to pass from above the roll plate to below the roll plate through the gap between the rear edge of roll plate 404 and the inner wall of centerpiece 401, held substantially vertical to ground in this example. A pattern of through openings are provided through the vertical wall of centerpiece 401 for universal mounting of the bin to store shelving, walls, or other structures.

FIG. 5 is a right-side elevation view of retail display bin 400 of FIG. 4. In this view, bin 400 reveals the slope of internal roll plate 404 descending from intersection with the rear surface of front panel 403 approximately at mid-height of the bin toward the rear of the bin stopping short of the vertical wall of centerpiece 401. The gap between the inner surface of the vertical wall of centerpiece 401 and the rear edge of roll plate 403 is sufficiently larger than the diameter of a fruit stick, referenced herein as fruit sticks 502, to allow one fruit stick at a time to pass through the gap and roll toward the front of bin 401. Front panel 403 is a double-wall panel in this example and includes panel 501 to provide stability for mounting face plates carrying signs and retail advertising paraphernalia or art work.

Bin 400 may be stacked with fruit sticks oriented laterally to roll in the general direction of the arrows down plate 404 through the gap at the rear and down the floor of centerpiece 401 to hook wells 406a and 406 b. In this configuration bin 400 has a shorter height than length. In another embodiment bin 400 may have a height dimension larger than length dimension. Bin 400 may be installed in a refrigerated or cooled location. The packaged fruit is organic, and no preservatives are present in the fruit.

Bin 400 may be modularity cooled using a mister or other portable cooling device to keep fruit at a reasonable temperature. Bin 400 may be stacked to the top above plate 404 with fruit sticks 502. When customers remove fruit sticks from the hook wells, another fruit stick rolls down into the hook wells for the next customer, and all fruit sticks behind roll one step further, and with each rolling movement continue to saturate the fruit plugs in the sticks with fruit juice. This method of dispensing is dedicated to ensuring that the fruit sticks do not sit in one position of rotation for too long allowing juice to settle to one side of the tube and the cellular fruit at the top side to lose juice saturation.

Figure 6:
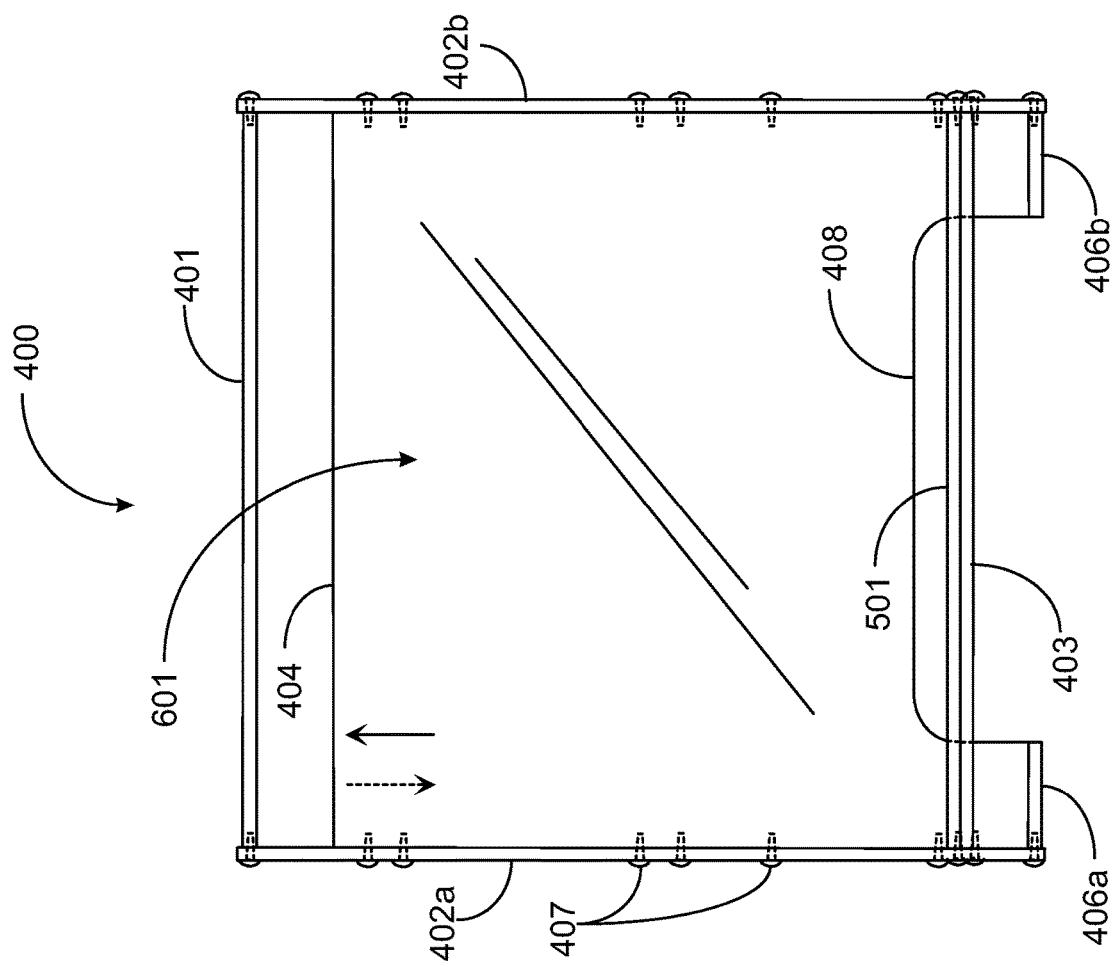
FIG. 6 is an overhead view of the retail display bin of FIG. 4.

FIG. 6 is an overhead view of retail display bin 400 of FIG. 4. Bin 400 in this example is assembled from formed centerpiece 401, side panels 406a (left) and 406b (right), front panel 403, and roll plate 404. The distance between center lines of hook wells 406a and 406b may roughly equal the length of a fruit stick (502, FIG. 4). In one embodiment multiple bins 400 may be mounted adjacently or together to provide separated measured bin space for fruit sticks of different fruit types or multiple fruit types combined into one fruit stick.

Front panel 403, including back wall 501, is set back toward the rear of bin 400 from the front of hook wells 406a and 406b by a distance just larger than the diameter of a fruit stick to enable access through the front of the bin. A lid and latch (not illustrated) may be provided and installed on bin 400 in one embodiment to prevent customers from taking fruit sticks through the top of the bin. In one embodiment, bin 400 may be iced by stacking the bin with fruit sticks and then putting ice or a cooling device in the bin on top of the fruit sticks. In another embodiment, a separate cooling device or jacket may be designed and manufactured for enveloping bin 400 in a manner that the walls and floor of the bin may be cooled while the bin may be displayed in hot weather, like at a flea market or outside venue. In another embodiment, a roller machine having mechanical wheels powered by an electric motor may be installed into bin 400 or integrated with roll plate 404 such that the wheels contacting stacked fruit sticks may cause them to rotate in place and transfer the energy to adjacent sticks to achieve the same effect.

Element 601 depicts the free space within bin 400 above roll plate 404 for stacking in fruit sticks. Fruit sticks at the level of roll plate 404 roll from front to rear, drop through the gap and roll down to hook wells 406a and 406b according to the direction of the solid arrow (above roll plate) and the broken arrow (below roll plate). In one embodiment, bin 400 may be molded as a single contiguous piece wherein the roll plate may be provided separately to snap into or otherwise be installed to the bin. In one embodiment, bin 400 may be mounted inside a walk-in cooler or cooler space with an accessible door. In one embodiment, bin 400 may be housed within a single cooling space having a door for access and extending out from a wall of a larger cooling room that may be used for cold beers, chilled wines, to cool meats and vegetables or other perishables.

Figure 7B:
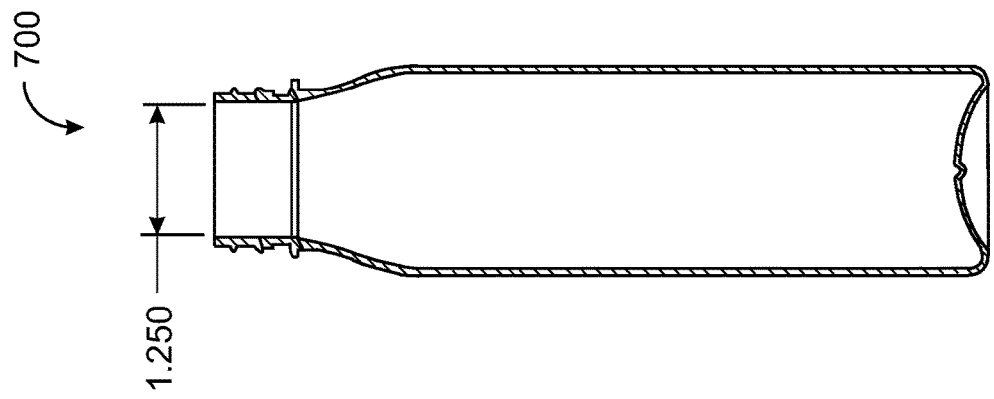
FIG. 7B is a section view of the tube of FIG. 7A, taken along section line 7B-7B of FIG. 7A.
Figure 7A:
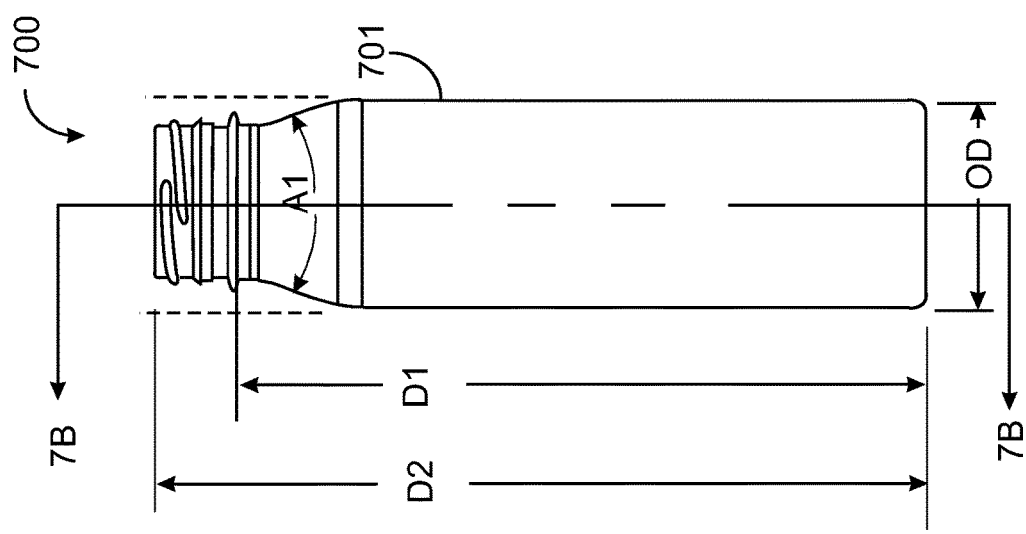
FIG. 7A is a side elevation view of a fruit stick tube according to an embodiment of the invention.

FIG. 7A is a side elevation view of a fruit stick tube 700 according to an embodiment of the invention. FIG. 7B is a cross-section view of the fruit stick tube of FIG. 7A. Fruit stick tube 700 has a tube body 701 having an open end and a closed end. Tube 700 may be formed of rigid or flexible polymer. Tube 700 is analogous to fruit stick 502 of FIG. 5. Tube body 701 may be manufactured from a food-grade polymer material. In the embodiment shown body 701 has an outside diameter (OD) of about 1.90 inches, but the diameter may be different in other embodiments. Vertical dimension D1 is in this embodiment is about 6.25 inches but may be different in other embodiments. Vertical dimension D2 may be about 7.0 inches, but also may be different in other embodiments. In one embodiment included angle A1 may be about 30 degrees but may be different in other embodiments.

Tube body 701 in this embodiment has external threading at the open end of the tube to accept a threaded cap (not shown) having internal female matching threads. The cap may be a plastic cap like a water bottle cap, and in embodiments of the invention has an outside diameter equal to or less than the OD of the tube, such that the tube will lie on a side without the cap touching a surface upon which the tube may rest, The open end of the tube has an inside diameter in this embodiment of about 1.25 inches, and a plug of fruit inside the tube has a diameter of about 1.13 inches, allowing the plug to pass through the open end with an overall clearance of about 0.125 inches. This relationship allows the fruit plug to be passed into the tube, and the fruit plug to be pulled out without creating a suction that would tend to make the plug stay in the tube.

In one embodiment, tube 700 contains a contiguous cored plug of fruit just shorter than the length of the tube body 701. The fruit type may be watermelon, pineapple, grapefruit, or another melon-type fruit or fleshy fruit that can be slabbed for coring and extrusion. In one embodiment, there are half-plugs of two different fruit types in one fruit stick 700. For example, a pineapple plug one half of the length of tube body 701 may be first extruded into tube body 701 followed by a watermelon plug one half of the length of tube body 701. Pineapple is heavier than watermelon, therefore pineapple would likely be the bottom fruit so as not to crush the watermelon when batches are shipped in an upright position.

In one embodiment, tube body 701 contains multiple cored fruit plugs deemed bite-sized pieces that are already separated. In this case the pieces may represent different fruits that are alternately extruded into the tube body during processing. Plug lengths may be created in the top and tail machine process through adjusting the thicknesses of cut slabs of fruit for coring. For example, if a fruit stick 700 is six inches in length, then a half and half pineapple and watermelon stick would contain one 3-inch pineapple plug and one 3-inch watermelon plug, and the juices captured during the process.

In one embodiment of the process, slabs of different fruits slabbed to bite size thicknesses may be stacked and cored and extruded into batch tubes at the same time. In another embodiment pineapple may be run first and the stations tubes may loop back for a watermelon process, and so on until the tube is packed full and capped and washed for inspection and shipment. It may be noted herein that labeling of fruit sticks 700 may be performed before packing or after packing without departing from the spirit and scope of the present invention. Customers select product by seeing the advertising on a bin 400 and retrieving one or more fruit sticks from the hook wells 406a and 406b. The retrieval action enables fruit sticks in the bin to roll forward and refill the hook wells with the next fruit sticks.

It will be apparent to one with skill in the art that the fruit processing and retail presentation system of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

It will be apparent to the skilled person that the arrangement of elements and functionality for the invention is described in different embodiments in which each is exemplary of an implementation of the invention. These exemplary descriptions do not preclude other implementations and use cases not described in detail. The elements and functions may vary, as there are a variety of ways the hardware may be implemented within the scope of the invention. The invention is limited only by the breadth of the claims below.

I claim:

1. A method for producing fresh fruit products, the method comprising:
    cutting a fresh fruit, producing a slab having an upper and a lower parallel surface of the fresh fruit with rind only at an outer periphery, the slab having a height of a first dimension;
    coring the slab of fresh fruit vertically into a plurality of round plugs having a length equal to or greater than the first dimension, by a downward stroke of a plunger, the plunger having a plurality of coring tools;
    inserting the plurality of round plugs simultaneously, in the downward stroke of the plunger, into a plurality of tubes held vertically;
    capping the plurality of tubes, sealing the plurality of round plugs within; and
    washing and drying the plurality of tubes.

2. The method of claim 1, further comprising packing the plurality of tubes for shipment to a point-of-sale.

3. The method of claim 1 comprising stacking a first slab of a first fruit and a second slab of a second fruit prior to the step of coring, such that each of the plurality of round plugs comprise both the first fruit and the second fruit.

4. The method of claim 3 wherein the first fruit is pineapple and the second fruit is watermelon.

5. The method of claim 1 comprising stacking more than two slabs of fruit of the same or different fruit such that the overall height of the stack is just less than the length of the plurality of tubes.

* * * * *